United States Patent Office 3,554,971
Patented Jan. 12, 1971

3,554,971
AMORPHOUS OR WEAKLY CRYSTALLINE AROMATIC POLYAMIDES
Michael Edward Benet Jones and Isaac Goodman, Runcorn, England, assignors to Imperial Chemical Industries Limited, London, England, a corporation of Great Britain
No Drawing. Continuation-in-part of application Ser. No. 550,149, May 16, 1966. This application Jan. 21, 1969, Ser. No. 792,773
Claims priority, application Great Britain, Jan. 24, 1968, 3,697/68
Int. Cl. C08g 20/20
U.S. Cl. 260—47                              31 Claims

ABSTRACT OF THE DISCLOSURE

Amorphous or at most weakly crystalline aromatic polyamides made by polycondensation of at least one diaminodiphenyl sulphone and one or more diacids from a grouping which includes, for example, isophthalic acid, certain naphthalene dicarboxylic acids, polyhaloterephthalic acids and haloisophthalic acids other than 5-haloisophthalic acids, alkoxyterephthalic acids and alkoxyisophthalic acids and dicarboxy-diphenyl ethers. The polyamides are melt-fabricatable.

---

This application is a continuation-in-part of copending application S.N. 550,149, filed May 16, 1966, now abandoned.

This invention relates to synthetic, essentially linear condensation polymers. More particularly it relates to polymers prepared from aromatic monomers in which the functional groups are directly attached to aromatic carbon atoms, and to their preparation.

It is known that diamines or certain derivatives thereof, e.g. their salts, may be reacted with dibasic acids or certain derivatives thereof, e.g. their acid halides, to form polyamides. The polyamides from aliphatic diamines and aliphatic diacids have been known for decades: depending upon their structures, they are generally crystalline materials of high melting point or amorphous materials of relatively low softening point. While the former have found wide use as film- and fibre-forming materials and as mouldable thermoplastics, the latter are generally too low softening and too susceptible to thermal and chemical attack to be of use for this purpose.

More recently, the production of polyamides and copolyamides from combinations of one or more aromatic dicarboxylic acids with one or more aromatic diamines has been described: see, for example, French patent specifications 1,199,458, 1,199,459 and 1,199,460, U.S. patent specifications 3,063,966 and 3,094,511 and British patent specification 871,578. These aromatic polyamides and copolyamides are said to be characterised by very high melting points and by inertness to a wide range of chemicals. However, as a class, they are also crystalline or readily crystallisable as formed. As a result, their utility is limited because while films and fibres may be formed from their solutions, their very high melting points preclude them from being shaped successfully from the melt e.g. by compression- or injection-moulding or by extrusion. This is because with a crystalline polymer it is necessary to operate such shaping processes at temperatures above its crystalline melting point in order to obtain the polymer in the required mobile form; and with a readily crystallisable polymer, even if it is prepared initially in the amorphous form crystallisation will generally occur when it is exposed to the conditions used during melt fabrication and therefore, once again, temperatures above the crystalline melting point are required to obtain the polymer in the desired mobile form. In the case of the aromatic polyamides described, thermal or oxidative degradation of the polymer generally occurs before such temperatures are reached.

Moreover, the products obtained by the operable solution processes will either be crystalline, brittle and opaque, or else amorphous, and therefore thermally metastable since exposure to elevated temperatures will induce crystallisation and hence embrittlement and loss of transparency. Furthermore, in amorphous form, the polymers may be crystallised on exposure to many liquid environments.

It would be desirable to produce polyamides having the attractive chemical and thermal stability of the crystalline and readily crystallisable aromatic polyamides and yet having the ability to be moulded or extruded by melt shaping, without concomitant thermal or oxidative degradation, and to be convertible to shaped articles, especially films, which are neither brittle as formed nor embrittled on exposure to heat and/or liquids.

It has generally been assumed that symmetry and periodicity of chemical structure in the component units are sufficient criteria for the display of crystallinity and crystallisability in polymeric materials, and conversely that the absence of these characteristics leads to the production of amorphous and non-crystallisable materials. However, these assumptions cannot be extended with success to aromatic polyamides because on the one hand we have found that certain polyamides having symmetrical and regularly recurring structural units are amorphous and non-crystallisable and on the other hand it is known that crystallinity and crystallisability can occur in polyamides whose structures are lacking both in structure symmetry and in periodicity.

We have now found, however, that by the choice of a diaminodiphenyl sulphone as the aromatic diamine and by careful selection of the aromatic diacids that may be used with it, aromatic polyamides may be obtained which are amorphous in character (or at most only weakly crystalline) as prepared and are not readily crystallisable: in fact they are at most only weakly crystallisable. In particular, their lack of crystallisability is such that, while still substantially retaining the thermal and chemical resistance of the crystalline and readily crystallisable aromatic polyamides, they have the advantage of being meltshapable (that is, they can be moulded or extruded from the melt, using conventional equipment for shaping thermoplastics, e.g. by compression moulding, injection-moulding or extrusion) under conditions at which degradation and decomposition may be avoided, to give useful shaped products in which the polymer is still amorphous or at most only weakly crystalline. In other words, exposure to the conditions encountered during melt shaping processes does not cause the polymers to crystallise, and to the extent that they are not crystallisable by these conditions they may be described as thermally non-crystallisable, and are clearly of a different kind to the crystalline or readily crystallisable aromatic polyamides described hitherto. Our thermally non-crystallisable aromatic polyamides may be formed into shaped articles, especially films, which are transparent and are not embrittled due to crystallisation on exposure to elevated temperatures and/or liquid environments. Films or our preferred polyamides, in fact, are capable of withstanding temperatures of 180° C. or even 200° C. almost indefinitely without embrittling or crazing. The polymers also dissolve to give stable solutions in a wider range of solvents than the crystalline and readily crystallisable aromatic polyamides.

The reason why the aromatic polyamides of our invention are not crystalline or thermally crystallisable is not entirely clear but is believed to be due to a number of contributing factors one of which appears to be a unique and hitherto unknown form of bonding between the sulphone groups of the diamine residues and the amide groups of the recurring diamide units.

According to the present invention, our amorphous or at most only weakly crystalline and thermally non-crystallisable aromatic polyamides are formed of macromolecular chains consisting essentially of aromatic diamide units derived from (a) as the diamine component at least one diaminodiphenyl sulphone and (b) as the diacid component at least one diacid which is free of atoms or groups which may prevent successful polycondensation and is selected from (i) isophthalic acid
(ii) naphthalene dicarboxylic acids capable of forming linear polyamides with aromatic diamines and having no more than one axis of symmetry
(iii) with the exception of monohaloterephthalic acids and 5-haloisophthalic acids, compounds containing a single six-membered aromatic carbocyclic ring carrying two carboxylic acid (—COOH) groups on non-adjacent carbon atoms and at least one halogen atom on a further carbon atom
(iv) compounds containing a single six-membered aromatic carbocyclic ring carrying two carboxylic acid (—COOH) groups on non-adjacent carbon atoms and on at least one further carbon atom a group having the structure —OR where R is a monovalent hydrocarbon radical or a substituted derivative thereof and
(v) compounds containing two six-membered aromatic carbocyclic rings each carrying a —COOH group attached directly thereto and linked together by a divalent atom or group selected from —CO—, —O— and residues of diols or by a single carbon atom the free valencies of which are satisfied by hydrogen atoms or other carbon atoms.

By the term amorphous or at most only weakly crystalline, as it is used in respect of our polymers both as prepared and after shaping, we mean the absence in particular of the property undergoing on heating a first order phase transformation of melting from the solid crystalline condition to the wholly liquid state. The presence or absence of this property may be detected, of course, by any normal examination method commonly used in the art, e.g. using a Du Pont Thermal Analyser at a heating rate of 20° C./minute. In some cases our polymers may be recognised in addition by their incapacity to diffract X-rays discretely and/or their inability to exhibit birefringence in the solid state.

While, in the formation of aromatic polyamides from diaminodiphenyl sulphones, selection of the diacids from the above categories will generally yield amorphous or at most only weakly crystalline products, we have found that those wherein at least 90% of the repeating diamide units are derived from the reaction of 4,4'-diaminodiphenyl sulphone with isophthalic acid are crystalline or crystallisable and such polyamides are excluded from our invention.

The polyamides of our invention are normally solids at room temperature and generally have reduced viscosities (measured on solutions of 1 gm. of the polymer in 100 cc. of 98% sulphuric acid at 25° C.) of at least 0.2. However, those polymers which have a useful combination of strength, chemical inertness and high softening point and find ready application as thermoplastic moulding materials have reduced viscosities of at least 0.3 and generally from 0.5 to 2.0.

Reduced viscosity is defined as $$\frac{t_1 - t_0}{t_0 \cdot c}$$

where $t_1$ is the flow time of the solution of the polymer in a suitable solvent in a viscometric test, $t_0$ is the flow time of the solvent alone under identical conditions and $c$ is the concentration of the solution calculated as grams of polymer per 100 ccs. of solvent.

THE DIAMINES

The diamines from which our polyamides are formed are diaminodiphenyl sulphones, for example 4,4'-, 3,3'-, 2,4'-, 2,3'-, and 3,4'-diaminodiphenyl sulphones. However, the most accessible are generally 3,3'-diaminodiphenyl sulphone and 4,4'-diaminodiphenyl sulphone.

THE DIACIDS

Of the diacids that may be used, category (i) requires no further comment. Examples of those in category (ii) are 1,3-, 1,4-, 1,6- and 1,7-naphthalene dicarboxylic acids.

The halo-substituted benzene dicarboxylic acids set out in category (iii) are preferably isophthalic and terephthalic acids containing halogen atoms as the sole substituents on the aromatic ring, although substituted derivatives of these acids may also be used wherein the additional substituents are not such as to prevent polycondensation with the diamine and are preferably alkyl or alkoxy groups containing from 1 to 6 carbon atoms or halogenated, e.g. chlorinated, derivatives thereof. Where two or three additional substituents are present, they may be the same or different.

These halo-substituted benzene dicarboxylic acids may contain up to four halogen atoms attached to carbon atoms on the benzene ring and where two or more halogen atoms are present, they may be the same or different. The halogen atoms are generally chlorine or (less often) bromine and while particular examples of the acids are 4-chloroisophthalic acid, 2,5-dichloroisophthalic acid and 2,5-dichloroterephthalic acid, similar dibromo-, difluoro-, chlorobromo-, trihalo-, and tetrahalo-isophthalic acids, chloro-, bromo-, and fluoro-terephthalic acids and dichloro- and chlorobromo-terephthalic acids may also be used. 2- and 6-chloroisophthalic acids may also be mentioned.

The diacids of category (iv) may be said to have the structures

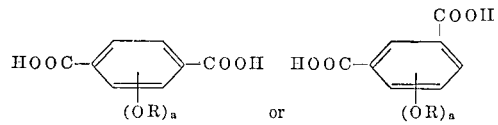

where R is a monovalent saturated hydrocarbon group or a substituted derivative thereof and $a$ is 1, 2, 3 or 4, but generally 1.

In these diacids, R may be any saturated hydrocarbon group, for example alkyl, aryl, aralkyl or alkaryl, where alk(yl) includes cycloalk(yl). Examples are methyl, ethyl, n-propyl, isopropyl, n-butyl, isobutyl, t-butyl, isomeric amyls, n-hexyl, n-heptyl, n-octyl, 2-ethyl, hexyl, n-decyl, n-octadecyl, eicosyl, phenyl, α-naphthyl, β-naphthyl, benzyl, β-phenylethyl, tolyl, xylyl, cyclopentyl, cyclohexyl, 4-methyl-cyclohexyl and cyclooctyl. We prefer R in all cases to be an aryl or alkyl group containing up to 6 carbon atoms because of the generally high glass transition temperatures thereby obtained in the resulting amorphous, thermally non-crystallisable polyamides. Examples are methyl, ethyl, propyl, isopropyl, butyl, amyl, hexyl and phenyl.

Our preferred acids in this category are mono- (particularly), di-, tri- and tetra-alkoxy or phenoxy substituted terephthalic acids and mono- (particularly), di-, tri- and tetra-alkoxy or phenoxy substituted isophthalic acids. Because of their ready availability and their ready reaction with the diamines to form polyamides having good physical properties, our much preferred acids are mono-alkoxy terephthalic acids and 2-, 4- and 5-alkoxyisophthalic acids.

The dicarboxydiphenyl compounds (v), that may be used may be represented by the structure:

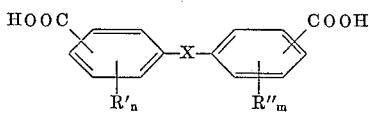

where X is (a) a residue of a diol, having the structure —(OK)$_x$O— where $x$ is a whole number, generally one or two, and K may be for example (i) a polymethylene chain having oxygen and/or sulphur atoms interposed between the carbon atoms (e.g. —CH$_2$CH$_2$OCH$_2$CH$_2$—) or (ii) a divalent hydrocarbon radical, e.g. alkylene or phenylene, or (iii) a radical of the structure

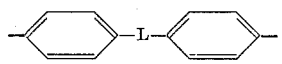

where L is a direct linkage or —O—, —S—, —SO—, —SO$_2$—, —CO— or a divalent hydrocarbon residue, particularly where there is but one carbon atom linking the two aromatic rings, e.g. as when derived from bis(phenyl)methane or 2,2-bis(phenyl)propane.

(b) —CO—

(c) —O— or (d) 

wherein Y and Y' may be, for example, hydrogen atoms, monovalent hydrocarbon groups (preferably containing from 1 to 6 carbon atoms), or halogenated derivatives thereof or may together form a divalent organic radical, e.g. polymethylene as in pentamethylene; R' and R" are preferably halogen atoms or alkyl or alkoxy groups containing from 1 to 6 carbon atoms and $n$ and $m$ may each be zero or whole numbers from 1 to 4. Where $n$ or $m$ is 2 or more each R' or R" (as the case may be) may represent a different substituent, if desired.

Our preferred dicarboxydiphenyl compounds are those wherein $n=m=$zero and wherein X is —O—, —CO— or —C(Y)(Y')— and examples are 4,4'-dicarboxybenzophenone, 4,4'-dicarboxydiphenylmethane, 3,3'-dicarboxydiphenylmethane, 2,2 - (4,4' - dicarboxydiphenyl)propane, 1,1-(4,4'-dicarboxydiphenyl) cyclohexane and 4,4'-dicarboxydiphenyl ether. Others that may be mentioned are bis(4-carboxyphenoxy) alkanes and bis(carboxyphenoxy) benzenes.

If desired, a mixture of two or more of our specified diamines and/or two or more of our specified diacids may be used. Mixtures of 4,4'-dicarboxydiphenyl ether with isophthalic acid in molar ratios of 100/0 to 10/90 give very useful polymers.

One group of polyamides that is especially preferred because of their physical and chemical properties consists of those derived from 4,4'-diaminodiphenyl sulphone or 3,3'-diaminodiphenyl sulphone and one or more of 4,4' - dicarboxydiphenyl methane, 4,4' - dicarboxybenzophenone, 2,5-dichloroterephthalic acid, 4-chloroisophthalic acid, and 4,4'-dicarboxydiphenyl ether.

Represented structurally, such polymers are, of course, readily seen to be characterised by macromolecular chains consisting essentially of repeating units selected from those having the structures

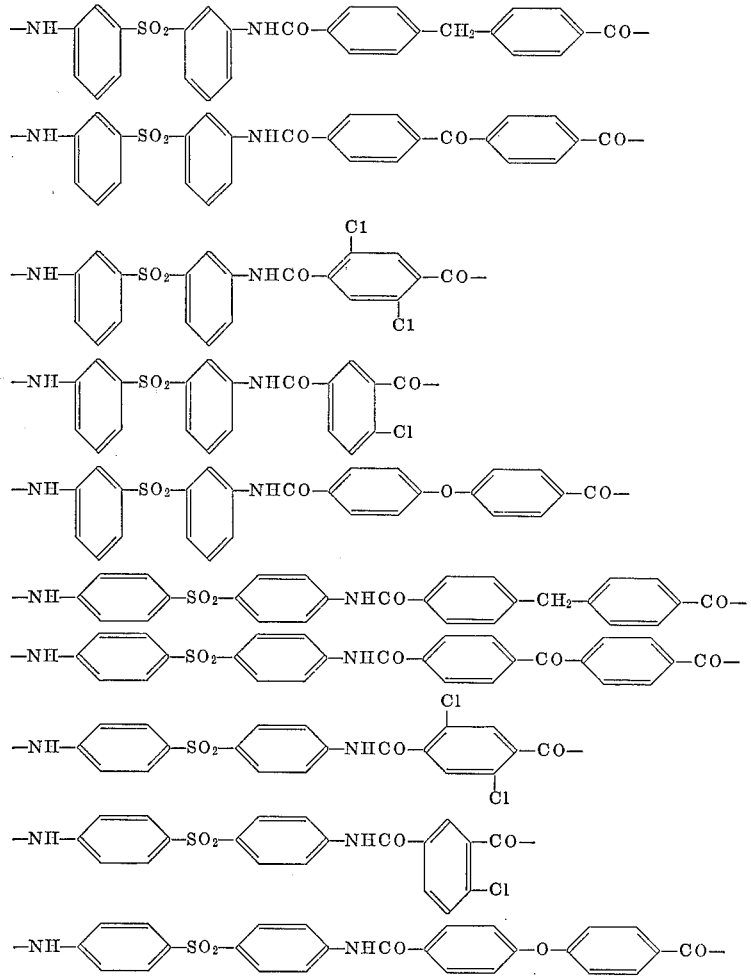

and combinations thereof.

Another group of polyamides also especially preferred for their physical and chemical properties consists of those derived from a mixture of one or more of 3,3'-diaminodiphenyl sulphone and 4,4'-diaminodiphenyl sulphone with a combination of up to 90 mole percent of isophthalic acid and at least 10 mole percent of 4,4'-dicarboxydiphenyl ether. Structurally, such polymers are, of course, represented by macromolecular chains consisting essentially of repeating units having the structures:

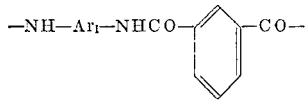

and

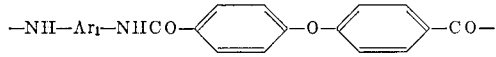

where $Ar_1$ is selected from the group consisting of

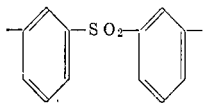 and 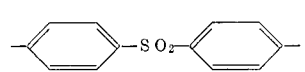

and at least 10% of the units forming the macromolecular chains have the structure II.

In addition to polyamides containing units derived solely from our specified diamines and diacids, our invention also includes the case where the diaminodiphenyl sulphone is replaced in part by other aromatic diamine material capable of polycondensing with the diacid to form polyamide, so long as the amount of aromatic diamine that is introduced does not induce crystallinity and in any case not more than 50 mole percent of the diaminodiphenyl sulphone is replaced. Examples of such diamines include particularly m-phenylene diamine, p-phenylene diamine and diaminodiphenyl ethers. m-Phenylene diamine and 4,4'-diaminodiphenyl ether may constitute up to 50 mole percent of the diamine mixture with 4,4'-diaminodiphenyl sulphone, if the acid is 4,4'-dicarboxydiphenyl ether, to give very useful polymeric products; those from 4,4' - diaminodiphenyl sulphone, 4,4' - diaminodiphenyl ether and 4,4'-dicarboxydiphenyl ether having a very useful combination of physical and chemical properties.

Represented structurally, it is readily seen that the resultant polymers are characterized by macromolecular chains consisting essentially of repeating units having the structures I and III or II and III, the repeating units of structure III forming at least 50% of the total number of repeating units:

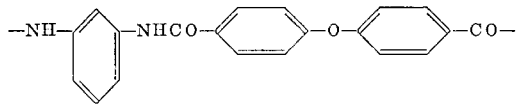

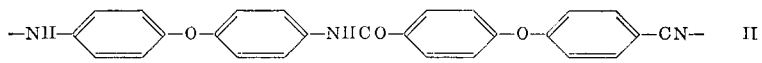

It will be understood that where at least 10 mole percent of the diaminodiphenyl sulphone is replaced by one or more other aromatic diamines, isophthalic acid may, if desired, form the only acidic consituent of the diamine units in the polymer, even where the diaminodiphenyl sulphone is the 4,4'-isomer. In fact, polyamides derived from a mixture of 90 to 50 mole percent of 4,4'-diaminodiphenyl sulphone and 10 to 50 mole percent of 4,4'-diaminodiphenyl ether with isophthalic acid have a combination of properties which are attractive in a thermoplastic material. Such polymers are, of course, represented structurally by macromolecular chains consisting essentially of repeating units having the structure

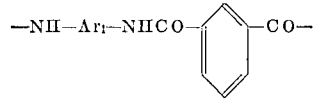

wherein from 90% to 50% of the repeating units $Ar_1$ has the structure

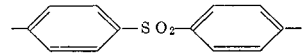

and in from 10% to 50% of the repeating units, $Ar_1$ has the structure

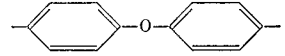

Similarly our specified diacid material may be replaced in part by at least one other aromatic diacid capable of polycondensing with the diamine to form polyamide so long as the amount of the aromatic diacid that is introduced does not induce crystallinity and in any case does not exceed 50 mole percent of the total diacid. An example of a suitable acid is terephthalic acid.

In addition, where further modification is desired, aliphatic diacid and diamine material may be added, so long as the amount of aliphatic diacid does not exceed 10 mole percent of the total diacid content and the amount of aliphatic diamine does not exceed 10 mole percent of the total diamine content.

THE PROCESS

Our polymers may be prepared by any process for polycondensing the given classes of diamines and diacids. For example, a solution of the diamine in an organic solvent may be contacted in the presence of an acid acceptor with a solution of the diacid chloride in a second solvent immiscible with the first polymerisation being effected at the interface. Less satisfactorily, the diacid may be heated with the diamine and the polyamide obtained directly.

While they are operable, both these processes have certain disadvantages where the preparation of our specified polyamides is concerned. For example, because of the nature of our copolymers, very high temperatures are required in melt reactions if products of high molecular weight are to be obtained and these may lead to thermal or oxidative degradation of the products. On the other hand, the interfacial technique is not very satisfactory when applied to some of our pairs of acids and amines. In general, therefore, we prefer to effect the polymerisation in solution in an organic compound which is liquid under the conditions of a reaction, is a solvent for both the acid (in the form of acid halide) and amine components and has a swelling or at least partial solvation action on the polymeric product under the conditions of the reaction. This allows the polymerisation to be effected at only moderate temperatures (below 100° C., if desired), thereby avoiding decomposition or degradation of the products. Preferably, the reaction is effected in the presence of an acid acceptor which does not interfere with the polymerisation and which is also soluble in the chosen solvents. Such acid acceptors are well-known for polycondensation reactions and common examples are tertiary amines such as pyridines and inorganic salts of weak acids and strong bases. Where the acid acceptor is insoluble in the polymerisation solvent (e.g. as in the case of sodium carbonate) it may be supplied as a solid suspension or in solution in another solvent. In such cases it is sometimes preferable to add a surface active agent also. In many cases, water is acceptable as the solvent for the acid acceptor but the molecular weight of the product may be adversely affected unless a rapidly reacting combination of diacid and diamine is involved.

Organic compounds that may be used as solvents are generally highly polar in character. It is preferred to choose those in which the polymer remains in solution until a high molecular weight is achieved. Examples of suitable solvents are methyl ethyl ketone, acetonitrile, propionitrile, cyclic tetramethylene sulphone, 2,4-dimethyl cyclic tetramethylene sulphone, hexamethylphosphoramide, N-methyl pyrrolidone, tetramethylurea, N,N-dialkylcarboxamides of aliphatic carboxylic acids containing at least two carbon atoms including carboxy carbon atoms, e.g. N,N-dimethylacetamide and N,N-dimethylpropionamide, and halogenated hydrocarbons containing at least two halogen atoms selected from chlorine and bromine, e.g. methylene chloride. N,N-dimethylacetamide is generally used.

When an N,N-dialkylcarboxamide or N-methylpyrrolidone is used as the solvent, no additional acid acceptor need be present.

In a preferred polymerisation procedure, the acid in the form of its dihalide is added to a solution of the amine or a salt thereof (e.g. the hydrochloride) in dimethylacetamide at low temperatures (generally about —20° C.), usually under an atmosphere of nitrogen, and the resultant solution is stirred vigorously. Polymerisation is effected rapidly at that temperature and the contents are stirred for about 15 minutes and then allowed to warm to room temperature, when they are stirred for a further 2–3 hours. The resultant polymer is recovered, e.g. by precipitation by pouring the solution into water.

The polymers of the invention are characterised by their generally amorphous or at most only weakly crystalline nature. They are also at most only weakly crystallisable as prepared and in particular they are not crystallised by thermal treatments such as exposure to the conditions encountered during melt fabrication or prolonged exposure to temperatures below their softening points. In general, they exhibit remarkably high softening points despite their lack of crystallinity and often show heat distortion temperatures of 200° C. or more. They are generally transparent and white and may be shaped (e.g. by extruding, moulding or vacuum forming) in conventional equipment for shaping thermoplastic materials. Alternatively, they may be dissolved in suitable solvents and transparent films, filaments or fibres may be obtained from the solutions. The films, filaments and fibres, may be drawn if desired.

Our preferred polyamides are resistant to corrosive atmospheres both acid and alkaline, are substantially non-flammable and resist most forms of degradation; thermal, chemical or from radiation. In particular, they give transparent films and moulded parts which resist crazing on immersion in various organic solvents. These preferred polymers also show useful dielectric properties and are particularly useful, e.g. in the form of film or coatings, for insulating current-carrying components in electrical apparatus. Thus, for example, they may be used as slot liners in electrical motors and insulation in transformers, capacitors, cables, etc. In the form of film, they may also be used as decorative trim and as packaging for items to be exposed to radiation. They may also be moulded, e.g. into hot-water or corrosion resistant pipe or into containers. Solutions of the polymer may be used as varnishes and adhesives and for coating wire, fabric, etc. Fibres formed from the polymers, for example by spinning from solution, may be woven into fabric, e.g. for making protective clothing or filters, or may be formed into woven electrical sheathing.

The polymers of the invention may be mixed with additives such as heat and light stabilisers, lubricants, plasticisers, pigments, dyes, mould-release agents and fillers such as glass fibre, asbestos fibre, finely powdered metals or metal oxides, graphite, carbon black, ground glass and molybdenum disulphide, and may be blended with other polymeric materials, natural or synthetic.

The invention is now illustrated but in no way limited by the following examples in which all parts are expressed as parts by weight, and viscosity measurements, unless otherwise stated, are in 98% sulphuric acid at 25° C. In these examples, temperature dependent tensile deformation tests were measured on a sample kept under a constant load and submitted to regular temperature increments of 20° C.; the samples are allowed to equilibrate with their surroundings between each stepwise temperature increment. Tensile tests at room temperature were measured on a Hounsfield Tensometer Type E using a rate of elongation of 1½ inches/minute. In both cases, standard dog-bone samples having a neck 1" long and ⅛" wide were used.

EXAMPLE 1

2.483 parts of 4,4'-diaminodiphenyl sulphone were dissolved in 28 parts of pure dry N,N-dimethylacetamide and the stirred solution was cooled to —20° C. 2.531 parts of naphthalene-1,4-dicarboxylic acid dichloride were then added in a single portion using 9.35 parts of dimethylacetamide in two equal portions to rinse out any residual acid chloride. After 15 mins. at —20° C. the reaction mixture was allowed to warm to 20° C. and stirring was continued at this temperature for 3 hours. After dilution with 47.2 parts of dimethylformamide the solution was added dropwise to 1,000 parts of rapidly stirred distilled water. The precipitated polymer was filtered, washed well with boiling water and again with boiling methanol and dried at 80° C./0.5 mm. of Hg absolute pressure for 16 hours. The yield was 4.5 parts of an amorphous melt-shapable polymer having a reduced viscosity of 1.21 and a softening point, determined in a tensile heat distortion test at constant load of 264 lbs./sq. in., of above 300° C.

Film cast from dimethylformamide solution was drawn at 240° C. and the drawn film was held under tension while immersed in anhydrous formic acid at 95° C. for a period of 10 mins. On examination by X-rays the polymer was shown to have at most a very low degree of crystallinity, insufficient to show a first order phase transformation of melting from the solid crystalline condition to the wholly liquid state, even after these drastic measures to induce crystalline order.

Undrawn film cast from dimethylformamide solution and then dried at 140° C. for 20 hours under an absolute pressure of 0.05 mm. of Hg had an average tensile yield stress of $9.6 \times 10^3$ lbs./sq. in. and an average tensile modulus of $1.4 \times 10^5$ lbs./sq. in.

Filaments could also be spun from dimethylformamide solutions.

It will readily be understood by the skilled polymer chemist that the polymer prepared in Example 1 may be represented as consisting essentially of repeating units of the structure

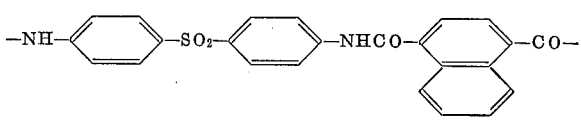

It will also be understood that the polymers prepared in the remaining examples may be represented similarly, and for convenience the structures of their repeating units are tabulated below, the letter "Q" signifying the structure

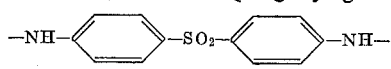

and the examples describing copolymers being indicated by an asterisk.

| Example | Structure of repeating unit |
|---|---|
| 2 | —NH—⟨C₆H₄⟩—SO₂—⟨C₆H₄⟩—NHCO—⟨naphthalene⟩—CO— |
| 3 | —Q—CO—⟨C₆H₄⟩—CH₂—⟨C₆H₄⟩—CO— |
| 4 | —NH—⟨C₆H₄⟩—SO₂—⟨C₆H₄⟩—NHCO—⟨C₆H₄⟩—CO— |
| 5* | —Q—CO—⟨C₆H₄⟩—CO— (50%) and —NH—⟨C₆H₄⟩—O—⟨C₆H₄⟩—NHCO—⟨C₆H₄⟩—CO— (50%) |
| 6* | —Q—CO—⟨C₆H₄⟩—O—⟨C₆H₄⟩—CO— (80%) and —NH—⟨C₆H₄⟩—O—⟨C₆H₄⟩—NHCO—⟨C₆H₄⟩—O—⟨C₆H₄⟩—CO— (20%) |
| 7* | —Q—CO—⟨C₆H₄⟩—CO— (80%) and —NH—⟨C₆H₄⟩—NHCO—⟨C₆H₄⟩—CO— (20%) |
| 8 | —Q—CO—⟨C₆H₂Cl₂⟩—CO— |
| 9 | —Q—CO—⟨C₆H₃Cl⟩—CO— |
| 10 | —Q—CO—⟨C₆H₄⟩—CO—⟨C₆H₄⟩—CO— |
| 11 | —Q—CO—⟨C₆H₄⟩—CH₂—⟨C₆H₄⟩—CO— |
| 12* | —Q—CO—⟨C₆H₄⟩—CO— (80%) and —Q—CO—⟨C₆H₄⟩—O—⟨C₆H₄⟩—CO— (20%) |
| 13* | As for 12 but with 50% of —Q—CO—⟨C₆H₄⟩—CO— |
| 14* | —Q—CO—⟨C₆H₄⟩—CO—⟨C₆H₄⟩—CO— (50%) and |

| Example | Structure of repeating unit |
|---|---|
| | and 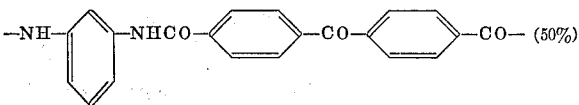 (50%) |
| 15* | 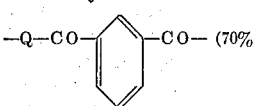 (70%) |
| 17 | and 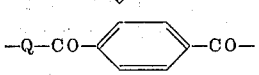 (30%) |
| 16 | As for 5 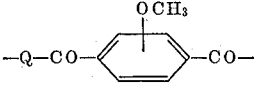 |
| 18 | 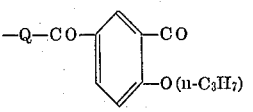 |
| 19 | 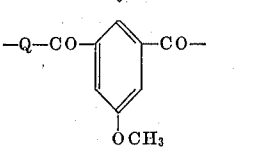 |
| 20 | 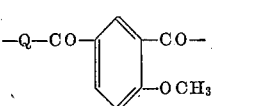 |
| 21 | 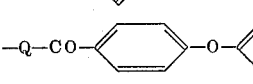 |
| 22 | 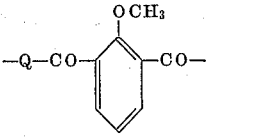 |
| 23 | As for 21. |
| 24 | As for 20. |
| 25 | 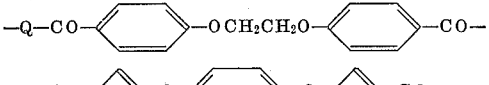 |
| 26 | 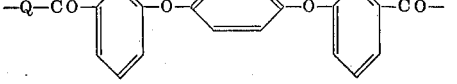 |
| 27* | As for 13. |
| (28* to 31*). | 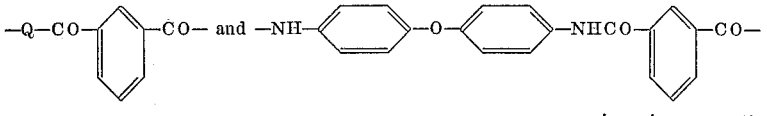
in various proportions. |

EXAMPLE 2

The process of Example 1 was repeated using 2.483 parts of 3,3'-diaminodiphenyl sulphone and 2.531 parts of naphthalene-1,4-dicarboxylic acid dichloride. 4.3 parts of an amorphous melt-shapable polymer having a reduced viscosity of 0.28 were obtained. It did not soften below 300° C.

The polymer in powder form was still amorphous on X-ray examination after the following treatments:

(a) immersion in formic acid at 95° C. for 10 mins.
(b) annealing from 250° C. at 2° C./min., and
(c) refluxing with benzyl benzoate for 20 hours.

EXAMPLE 3

The process of Example 1 was repeated using 1.242 parts of 4,4'-diaminodiphenyl sulphone and 1.466 parts of the diacid chloride of 3,3'-dicarboxydiphenylmethane. 2.3 parts of an amorphous melt-shapable polymer were obtained which exhibited a reduced viscosity of 0.86.

In an attempt to induce crystallinity, transparent film cast from dimethylformamide solution was drawn over a hot bar at 180° C. and then held under light tension while immersed in formic acid at 95° C. for 10 mins. The product was still amorphous upon X-ray examination.

EXAMPLE 4

The process of Example 1 was repeated using 2.485 parts of 3,3'-diaminodiphenyl sulphone and 2.025 parts of isophthaloyl chloride. The yield was 3.1 parts of amorphous melt shapable polymer having a reduced viscosity of 0.31 and softening point of 300–320° C. After each of the three treatments identified as (a), (b) and (c) in Example 2, samples showed insufficient crystallinity to show the first order phase transformation of melting from the solid crystalline condition to the wholly liquid state. The polymer had a softening point of 300–320° C.

EXAMPLE 5

A copolyamide was prepared using the technique described in Example 1 from a mixture of 24.83 parts (50 mole percent) of 4,4'-diaminodiphenyl sulphone and 20.00 parts (50 mole percent) of 4,4'-diaminodiphenyl ether which was dissolved in 131 parts of dimethylacetamide and reacted with 40.60 parts of isophthaloyl chloride, using 9.35 parts of dimethylacetamide in two equal portions as a rinse. After 2 hours reaction the viscous solution was diluted with about 380 parts of dimethylformamide and the polymer was recovered in the manner described in Example 1. After washing and drying, 68 parts of amorphous melt shapable polymer having a reduced viscosity of 1.20 were obtained.

Film cast from dimethylformamide, drawn and immersed while under light tension in a refluxing mixture of equal volumes of dimethylacetamide and water was amorphous on X-ray examination. A sample of compression-moulded film when examined in a tensile heat distortion test at 264 lb./sq. in. constant load showed a 10% extension at 280° C. and 100% extension at 302° C.

Filaments and fibres could be spun from the dimethylformamide solution.

EXAMPLE 6

A mixture of 1.986 parts (80 mole percent) of 4,4'-diaminodiphenyl sulphone and 0.400 part (20 mole percent) of 4,4'-diaminodiphenyl ether was dissolved in 28 parts of N,N-dimethylacetamide, and 2.951 parts of the diacid chloride of 4,4'-dicarboxydiphenyl ether were added. Reaction conditions were as in Example 1 and 4.3 parts of polymer having a reduced viscosity of 2.30 were recovered.

Film cast from dimethylformamide was clear, had a degree of toughness greater than 10 and was found to be amorphous on examination by X-rays. Drawing and/or annealing strips of the film failed to induce any crystallinity.

Similar experiments using proportionately more of the 4,4'-diaminodiphenyl ether in the diamine mixture showed that this diamine had to be present in an amount in excess of 50 mole percent of the total diamine mixture before crystalline polymers were obtained.

EXAMPLE 7

Using the process of Example 5, a copolyamide was prepared from 0.216 part (20 mole percent) of meta-phenylene diamine 1.986 parts (80 mole percent) of 4,4'-diaminodiphenyl sulphone and 2.030 parts of isophthaloyl chloride. After isolation, washing, and drying, 2.9 parts of an amorphous melt-shapable polymer having a reduced viscosity of 0.76 were obtained.

Transparent films were cast from solution in dimethylformamide, and after drawing and treating with formic acid as described in Example 1, these were still amorphous on X-ray examination.

In a tensile heat distortion test, as described above, samples of film showed 10% extension at 296° C. and 100% extension at 305° C.

EXAMPLE 8

5.12 parts of 4,4'-diaminodiphenyl sulphone, 3.5 parts of sodium bicarbonate and 0.1 part of sodium lauryl sulphate were emulsified in a high speed stirrer with a mixture of 80 parts of distilled water and 133 parts of pure methylene chloride. After 5 minutes stirring, a solution of 5.34 parts of 2,5-dichloroterephthaloyl chloride (M.P. 80–81° C.) in 30 parts of methylene chloride were added. After a further 5 minutes stirring, the precipitated polymer was isolated by filtration, washed with boiling water followed by boiling methanol, and dried to yield 3.3 parts of polymer having a reduced viscosity of 0.24 and a softening point above 320° C.

X-ray examination of an annealed sample of polymer showed no evidence of crystallinity.

EXAMPLE 9

2.56 parts of 4,4'-diaminodiphenyl sulphone were reacted as in Example 8 with 2.58 parts of 4-chloroisophthaloyl chloride in the presence of 1.9 parts of sodium bicarbonate and 0.1 part of sodium lauryl sulphate. After washing well with boiling water followed by boiling methanol, 1.7 parts of polymer were obtained having a reduced viscosity of 0.27.

Differential thermal analysis on a Du Pont Thermal Analyser at a heating rate of 20° C./minute gave no evidence of a first order phase transformation of melting from the solid crystalline form to the wholly liquid form. X-ray examination showed very weak crystallinity which was not increased by annealing from 200° C. at 5° C./hr.

EXAMPLE 10

2.487 parts of 4,4'-diaminodiphenyl sulphone were dissolved in 28 parts of pure, dry dimethylacetamide and cooled to −20° C. with stirring. 3.074 parts of the diacid chloride of 4,4'-dicarboxybenzophenone (M.P. 133–4° C.) were then added, the last traces being transferred to the reaction flask by washing with two portions each of 4.7 parts of solvent. After stirring for 10 minutes at −20° C., the solution was allowed to warm to 22° C. and stirred at this temperature for 3½ hours. The viscous solution was then diluted with 95 parts of dimethylformamide and the polymer recovered by dropwise addition of this solution to 1,000 parts of stirred distilled water. After filtration, the polymer was washed with boiling water and again with hot methanol and dried at 80° C. under vacuum for about 16 hours. 5.2 parts of polymer were obtained having a reduced viscosity of 0.95.

The polymer as prepared was melt shapable and almost completely amorphous and no change was produced by annealing from 200° C. or by drawing samples of film at 280° C.

Samples of cast film were treated as described below and then examined by X-rays for evidence of crystallinity.

(a) Drawn at 325° C.: amorphous.
(b) Drawn at 320° C., then held at 310° C. for 5 minutes under tension: amorphous.
(c) Drawn at 320° C. followed by further drawing at 300° C. and held at 310° C. for 5 minutes under tension: oriented but amorphous.
(d) Drawn at 290° C. in presence of steam: amorphous.
(e) Drawn at 250° C.: amorphous.
(f) Drawn in steam at 100° C. and held at 300° C. for 15 minutes under tension: amorphous.

Samples of film examined in a tensile deformation test at 264 lbs./sq. in. loading showed 10% extension at a temperature of 317° C. and 100% extension at 325° C.

In tensile tests, carried out over a range of temperatures at a strain rate of 2 in./min., the following average values of the tensile yield stress and tensile modulus (of cast film) were obtained:

| Temperature, °C.: | Yield stress, dynes/cm.$^2$ | Initial tensile modulus, dynes/cm.$^2$ | Elongation to break, percent |
|---|---|---|---|
| 18 | $8.3\times10^8$ | $2.1\times10^{10}$ | 25–40 |
| 50 | $7.4\times10^8$ | $1.8\times10^{10}$ | 30–45 |
| 100 | $7.3\times10^8$ | $1.6\times10^{10}$ | 25–40 |
| 150 | $5.1\times10^8$ | $1.5\times10^{10}$ | 50–60 |
| 100 | $3.3\times10^8$ | $1.5\times10^{10}$ | 25–45 |
| 270 | $2.4\times10^8$ | $1.0\times10^{10}$ | 25–90 |
| 300 | $3.4\times10^8$ | $7.6\times10^9$ | 100–120 |

In a low frequency dynamic mechanical test the following values for the shear modulus were obtained:

Temp. °C.: Shear modulus, dynes/cm.$^2$
- −150 _____ $2.9\times10^{10}$
- −100 _____ $2.3\times10^{10}$
- −50 _____ $2.1\times10^{10}$
- 0 _____ $1.6\times10^{10}$
- 50 _____ $1.6\times10^{10}$
- 100 _____ $1.7\times10^{10}$
- 150 _____ $1.6\times10^{10}$ A sample of this polymer was extruded at 370° C. and its melt viscosity at a shear stress of $10^7$ dynes/cm.$^2$ was measured as $1.0\times10^8$ poise.

0.005 inch thick films were transparent, tough (having a degree of toughness of 7–9) and, when exposed to a temperature of 175° C. in air for 168 hours, unchanged in colour, degree of toughness and solution viscosity and still amorphous.

Samples of the film 2 inches long by 0.5 inch wide were immersed in the following solvents for 4 days at room temperature: chloroform, petroleum ether (B.P. 60–80° C.), methanol, acetone, benzene, water, 5 N sulphuric acid and 0.1 N sodium hydroxide. Each sample was then removed, dried in air and tested for degree of toughness and evidence of surface crazing. No evidence of the latter was found and the degree of toughness was unchanged, thus showing that no crystallisation had occurred.

EXAMPLE 11

2.483 parts of the diamine of Example 10 were reacted as in Example 8 with 2.889 parts of the diacid chloride of 4,4′-dicarboxydiphenylmethane (M.P. 108° C.) and after isolation, washing and drying, 4.3 parts of a polymer were obtained having a reduced viscosity of 0.82 and a softening point above 300° C. The polymer was amorphous as prepared and only weakly crystalline on moulding.

EXAMPLE 12

4.924 parts of 4,4′-diaminodiphenyl sulphone were dissolved in 51.5 parts of dimethylacetamide and reacted with a mixture of 3.244 parts (80 mole percent) of isophthaloyl chloride and 1.184 parts (20 mole percent) of the diacid chloride of 4,4′-dicarboxydiphenyl ether, as described in Example 1.

After isolation, purification and drying, 9.5 parts of an amorphous melt-shapable polymer having a reduced viscosity of 1.45 were obtained.

Film cast from dimethylformamide solution was transparent and tough (degree of toughness 9–10) and after drawing at 300° C. and immersing in formic acid at 95° C. while under light tension, was essentially amorphous on X-ray examination. A further sample of film examined in a tensile deformation test at a loading of 264 lbs./sq. in. showed an extension of 10% at 297° C. and of 100% at 302° C.

EXAMPLE 13

2.48 parts of 4,4′-diaminodiphenyl sulphone were dissolved in 23.4 parts of dimethylacetamide and reacted as in Example 1 with a mixture of 1.422 parts (50 mole percent) of the diacid chloride of 4,4′-dicarboxydiphenyl ether and 1.017 parts (50 mole percent) of isophthaloyl chloride. After isolation and drying, 4.2 parts of an amorphous melt-shapable polymer were obtained having a reduced viscosity of 1.57.

Samples of cast film were drawn and annealed from a temperature of 300° C. without inducing any crystallinity. Cast films had degrees of toughness of 7–10, an average tensile yield stress of $7.6\times10^8$ dynes/cm.$^2$ and a tensile modulus of $1.8\times10^{10}$ dynes/cm.$^2$ at room temperature.

EXAMPLE 14

0.541 part (50 mole percent) of m-phenylene diamine and 1.242 parts (50 mole percent) of 4,4′-diaminodiphenyl sulphone were dissolved in 23.4 parts of dimethylacetamide and reacted with 3.071 parts of the diacid chloride of 4,4′-dicarboxybenzophenone, as described in Example 1. After isolation and drying, 4.2 parts of an amorphous melt-shapable polymer were obtained having a reduced viscosity of 1.00.

Cast films were transparent and tough (degree of toughness 8–9) and were amorphous after drawing, annealing or treating with formic acid as described in Example 1.

EXAMPLE 15

3.045 parts (30 mole percent) of terephthaloyl chloride and 7.106 parts (70 mole percent) of isophthaloyl chloride were fused and stirred under an atmosphere of dry nitrogen. The mixture crystallised on standing at room temperature and 6.091 parts of this solid mixture were reacted with a solution of 7.449 parts of 4,4′-diaminodiphenyl sulphone in 32.7 parts of dimethylacetamide under the conditions described in Example 1. After isolation and drying, 11.5 parts of an amorphous melt-fabricatable polymer having a reduced viscosity of 1.41 were obtained.

Cast films were transparent and tough (degree of toughness 7–8) and no crystallinity could be induced by the treatment described in Example 1.

Samples of cast film examined in a tensile heat distortion test showed 10% extension at 320° C. and 100% extension at 332° C.

EXAMPLE 16

A polymer of the same composition as Example 5 was prepared by reacting a mixture of 11.62 parts of 4,4′-diaminodiphenyl sulphone and 10.00 parts of 4,4′-diaminodiphenyl ether in 79.5 parts of dimethylacetamide with 20.30 parts of isophthaloyl chloride. After precipitation into distilled water, washing once in a high speed mixer with 2% aqueous ammonia and four times with methanol and drying at 120° C. for 24 hours under an absolute pressure of 0.5 mm. of Hg, 33 parts of amorphous polymer were obtained having a reduced viscosity of 0.63. This polymer was extruded at 350° C., the melt viscosity at a shear stress of $10^7$ dynes/cm.$^2$ being $4.5\times10^5$ poises. No crystallinity could be detected on X-ray examination of the extrudates so produced.

Films and fibres were readily obtainable from solutions of the polymer in dimethylformamide. The polymer was also compression moulded readily at temperatures above 300° C. and films so produced had a degree of toughness 2–4.

EXAMPLE 17

2.482 parts of 4,4′-diaminodiphenyl sulphone (M.P. 173–4° C.) were dissolved in 28 parts of N,N-dimethylacetamide and reacted as in Example 1 with 2.327 parts of methoxyterephthaloyl chloride (M.P. 49.5–50° C.). After isolation, washing and drying, 3.8 parts of substantially amorphous melt-shapable polymer (reduced viscosity 1.07) were obtained.

Films cast from dimethylformamide after drying at 120° C. under vacuum were transparent with a degree of toughness of 3–4, a softening point of 265–285° C., a tensile yield stress of $1.1\times10^4$ lbs./sq. in., an initial modulus of $2.7 \times 10^5$ lbs./sq. in. and elongations to break of 5–30%. The softening point of the polymer was determined by examination of samples of film in a tensile deformation test. At a constant load of 264 lbs./sq. in. the temperature at which the length of the test piece had increased by 10% was 330° C. and 100% extension was reached at 337° C.

X-ray examination showed only a trace of three-dimensional order which was not increased on annealing from 200° C.

In contrast, the polymer prepared from terephthaloyl chloride and 4,4'-diaminodiphenyl sulphone was moderately crystallinne on X-ray examination and on examination by Differential Thermal Analysis, the melting point was found to be above 500° C. It could not be melt-shaped to give useful products.

EXAMPLE 18

2.97 parts of 4,4'-diaminodiphenyl sulphone were slurried in 155 parts of pure methylene chloride and the suspension emulsified with 60 parts of water containing 3.2 parts of sodium bicarbonate and 0.1 part of sodium lauryl sulphate. This emulsion was treated with a solution of 3.10 parts of 4-n-propoxyisophthaloyl chloride in 52 parts of methylene chloride. After 10 minutes reaction, the precipitate was filtered, washed with boiling water for 15 minutes, then with hot methanol and then dried at 80° C. under vacuum. 2.8 parts of polymer were obtained, having a reduced viscosity of 0.15. The polymer was amorphous both as prepared and on annealing from 200° C.

EXAMPLE 19

A solution of 1.52 parts of 4,4'-diaminodiphenyl sulphone in 120 parts pure methylene chloride was vigorously stirred at room temperature with 50 parts of an aqueous solution of 0.80 part of sodium carbonate and 0.05 part of sodium lauryl sulphate. To this emulsion was added a solution of 1.40 parts of 5-methoxyisophthaloyl chloride (M.P. 48° C.) in 40 parts of methylene chloride. The product was filtered after 15 minutes reaction and after washing with boiling water and drying at 75° C. under high vacuum 1.3 parts of polymer were obtained having a reduced viscosity of 0.15.

X-ray examination of the product showed little evidence of three-dimensional order and appealing from 150° C. produced no change.

EXAMPLE 20

2.48 parts of 4,4'-diaminodiphenyl sulphone were reacted as in Example 18 with 2.23 parts of 4-methoxyisophthaloyl chloride together with 1.8 parts of sodium bicarbonate as acid acceptor and 0.08 part of sodium lauryl sulphate as emulsifying agent. 1.4 parts of polymer having a reduced viscosity 0.21 were obtained. The polymer was amorphous on X-ray examination and annealing from 200° C. at 5° C./hour did not induce crystallinity.

EXAMPLE 21

2.475 parts of 4,4'-diaminodiphenyl sulphone were dissolved in 28 parts of pure dry dimethylacetamide, and after cooling to −20° C., the solution was reacted with 2.948 parts of the diacid chloride of 4,4'-dicarboxydiphenyl ether, as described in Example 1. After isolation washing and drying, 4.5 parts of amorphous melt-shapable polymer were obtained, having a reduced viscosity of 2.47 in sulphuric acid.

Transparent films 0.005 in. thick were obtained from dimethylformamide solution. These films had a degree of toughness of 10, a tensile yield strength of $8.3 \times 10^3$ lbs./sq. in. at room temperature and a tensile modulus of $2.0 \times 10^5$ lbs./sq. in. with elongations-to-break of 25–40%.

The films were completely amorphous on X-ray examination and no change was produced by annealing from 200° C., or drawing at 180° C.

EXAMPLE 22

2.50 parts of 4,4'-diaminodiphenyl sulphone were reacted, under conditions similar to those employed in Example 18, with 2.33 parts of 2-methoxyisophthaloyl chloride. 1.8 parts of sodium bicarbonate were used as acid acceptor and 0.1 part of sodium lauryl sulphate as emulsifying agent. 3.2 parts of polymer having a reduced viscosity of 0.21 and a softening point of 295–310° C. were obtained. The polymer was almost completely amorphous as prepared and annealing from 200° C. did not increase the crystalline content.

EXAMPLE 23

A polymer having a reduced viscosity of 1.29 was formed by the reaction of 8.85 parts of the diacid chloride of 4,4'-dicarboxydiphenyl ether and 7.44 parts of 4,4'-diaminodiphenyl sulphone in dimethylacetamide solution, as in Example 21. This polymer gave tough (degree of toughness 8–9) clear film on casting from dimethylformamide solution. After drying at 160° C. for 24 hours at an absolute pressure of 0.1 mm. of Hg, strips of this film were examined in a tensile deformation test at 264 lbs./sq. in. load. The temperature of 10% extension was 298° C. and of 100% extension was 300° C. The average tensile strengths and tensile moduli of this film were determined over a range of temperatures up to 250° C. and are shown in the following table.

| Temperature,° C.: | Yield stress, lbs./sq. in. | Initial tensile modulus, lbs./sq. in. | Elongation to break percent |
|---|---|---|---|
| 20 | $9.3 \times 10^2$ | $1.95 \times 10^5$ | 20–30 |
| 58 | $9.8 \times 10^3$ | $2.48 \times 10^5$ | 15–40 |
| 100 | $7.8 \times 10^3$ | $2.62 \times 10^5$ | 30–60 |
| 150 | $6.6 \times 10^3$ | $1.73 \times 10^5$ | 35–75 |
| 200 | $3.9 \times 10^2$ | $1.88 \times 10^5$ | 90 |
| 250 | $3.6 \times 10^3$ | $1.45 \times 10^5$ | 90 |

The ultraviolet stability of this polyamide was determined in a mercury-lamp "Agemaster" machine and compared with commercially available polymers. In this test, 0.005" films were exposed and the time to embrittlement determined. Under the conditions of test, the lifetime of this polyamide was ~170 hours which was similar to polypropylene and to poly(butene-1).

A sample of the same polymer having a reduced viscosity of 0.61 was extruded at 350° C. and a shear stress of $10^7$ dynes/cm.$^2$; the melt viscosity was measured as $1.4 \times 10^7$ poises.

EXAMPLE 24

2.33 parts of 4-methoxyisophthaloyl chloride were added to a stirred solution of 2.48 parts of 4,4'-diaminodiphenyl sulphone in 32.7 parts of N,N-dimethylacetamide at −5° C. After 10 minutes at this temperature the solution was allowed to warm to 20° C. and was stirred at this temperature for a further 2 hours. The polymer was isolated by precipitation into vigorously stirred distilled water and after filtration was washed in a high speed mixer, first with water, then with methanol. After drying for 24 hours at 95° C. under an absolute pressure of 0.2 mm. of Hg, 4.3 parts of polymer were obtained having a reduced viscosity of 0.61.

Film cast from dimethylformamide solution could be drawn at 230° C. and the drawn film was amorphous on X-ray examination. In further attempts to crystallise this material, drawn film was immersed in formic acid at 95° C. while being held under tension. After 10 minutes, the sample was removed, washed and dried, and examined by X-rays for evidence of crystallinity. None was detected.

Further samples of film cast from dimethylformamide solution and dried at 150° C. under an absolute pressure of 0.05 mm. of Hg for 48 hours were examined in a tensile deformation test. The temperature of 10% extension was 302° C. and of 100% extension was 303° C.

In room temperature tensile tests cast film had an average tensile yield stress of $9.5 \times 10^3$ lbs./sq. in. and an average tensile modulus of $1.6 \times 10^5$ lbs./sq. in.

EXAMPLE 25

2.483 parts of 4,4'-diaminodiphenyl sulphone were reacted with 3.395 parts of diacid chloride of 1,2-di-(4-carboxyphenoxy)ethane in 28 parts of N,N-dimethylacetamide under the conditions described in Example 1 to yield 4.2 parts of melt-shapable polymer having a reduced viscosity of 0.39.

X-ray examination of the powder showed only weak crystallinity and after annealing from 200° C., this disappeared.

EXAMPLE 26

2.483 parts of 4,4'-diaminodiphenyl sulphone were reacted with 3.890 parts of the diacid chloride of p-bis-(3-carboxyphenoxy)benzene (M.P. 71–73° C.) in 32.7 parts of N,N-dimethylacetamide. After isolation, washing and drying, 4.2 parts of polymer having a reduced viscosity of 0.52 was obtained.

Film cast from dimethylformamide solution was transparent and had a degree of roughness of 2–3. This film was completely amorphous to X-rays both as prepared and after annealing from 250° C. It had a softening point of 250–275° C.

EXAMPLE 27

2.483 parts of 4,4'-diaminodiphenyl sulphone were dissolved in 28 parts of N,N-dimethylacetamide and the solution cooled to −10° C. A mixture of 1.477 parts (50 mole percent) of 4,4'-dicarboxydiphenyl ether and 1.017 parts (50 mole percent) of isophthaloyl chloride were then added, as described in Example 1. After isolation, purification and drying, 4.2 parts of a polymer having a reduced viscosity of 1.57 were obtained.

Film cast from dimethylformamide was transparent and had a degree of toughness of 8–10, an average tensile yield stress (at room temperature) of $11.1 \times 10^3$ lb./sq. in. and an average tensile modulus (at the same temperature) of $2.7 \times 10^5$ lb./sq. in. The film was completely amorphous both as made and after drawing and annealing.

Similar experiments using the two acids in proportions in the range 100/0 to 10/90 mole percent gave polymers which were all amorphous.

EXAMPLE 28

A copolyamide was prepared from a mixture of 19.871 parts (80 mole percent) of 4,4'-diaminodiphenyl sulphone, 3.998 parts (20 mole percent) of 4,4'-diaminodiphenyl ether and 20.046 parts of isophthaloyl chloride in a total amount of about 188 parts of N,N-dimethylacetamide. After isolation and drying, 33 parts of an amorphous melt-shapable polymer having a reduced viscosity of 1.80 were obtained.

Transparent, tough films were obtained by casting from solution in dimethylformamide and by compression moulding at temperatures of 300–360° C. The compression moulded film showed a degree of toughness (defined as the number of times a sample film could be folded through 180° C. and back through 360° before fracture) of 3–6.

Crystallinity could not be induced by any of the treatments described in Examples 1 and 2.

In the tensile heat distortion test described above samples of cast film showed 100% extension at 290° C., while determinations of the shear modulus by a low frequency dynamic mechanical technique (Torsion Pendulum) gave values of $1.6 \times 10^{10}$ dynes/cm.² at 20° C. and $1.1 \times 10^{10}$ dynes/cm.² at 200° C.

In a series of further experiments, similar copolymers were prepared using increasing proportions of 4,4'-diaminodiphenyl ether. As a result it was found unexpectedly that although the polyisophthalamides of diaminodiphenyl ether are typical examples of highly crystalline and readily crystallisable aromatic polyamides, amorphous (or at most only weakly crystalline) and thermally non-crystallisabe copolyisophthalamides of mixtures of diaminodipheny sulphones with diaminodiphenyl ethers may be obtained wherein the diaminodiphenyl ether forms the major component of the diamine mixture, provided it constitutes less than 88 mole percent, and preferably less than 80 mole percent thereof. The copolyisophthalamides thus obtained also have unexpected advantages in melt-shaping applications because they exhibit improved tractability in the melt compared with those copolyisophthalamides wherein the diaminodiphenyl sulphone is the major constituent of the diamine mixture.

If desired, in said copolyamides from mixtures of major proportions of diaminodiphenyl ethers and minor proportions of diaminodiphenyl sulphones, up to 50 mole percent of the isophthalic acid may be replaced by at least one other aromatic dicarboxylic acid, particularly terephthalic acid and/or a dicarboxydiphenyl ether, e.g. 4,4'-dicarboxydiphenyl ether, provided that the amount of said replacement acid or acids used is not such as to induce crystallinity or introduce crystallisability into the polymer. Similarly, up to 50 mole percent of the diaminodiphenyl sulphone and/or up to 50 mole percent of the diaminodiphenyl ether may be replaced by at least one other aromatic diamine e.g. meta- or para-phenylene diamine, provided that the amount of said other diamine used should also not be such as to induce crystallinity or introduce crystallisability into the copolymer.

Where further modification is desired, aliphatic diacid and diamine material may be added, so long as the amount of aliphatic diacid does not exceed 10 mole percent of the total diacid content and the amount of aliphatic diamine does not exceed 10 mole percent of the total diamine content. However, it is generally preferred to avoid the presence of aliphatic residues in the polymer chains and the much preferred copolyisophthalamides are characterised by macromolecular chains consisting essentially of repeating diamide units having the structures I and II only.

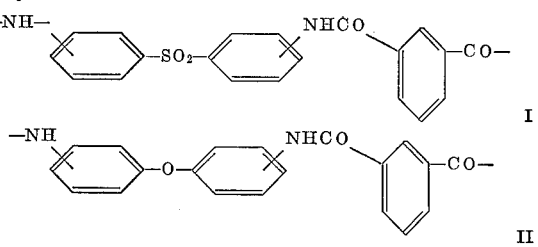

Most preferably, the —NH— groups are para to the sulphone and ether groups.

The properties and uses of these polymers are similar to those described hereinbefore. In particular, they may be converted to shaped articles such as fibres and filaments, and especially transparent coatings and films, which generally resist crazing on immersion in various organic solvents and are not crystallised by prolonged exposure to elevated temperatures below their softening points. They also show useful dielectric properties. Thus, in the form of films or coatings they are particularly suitable for the insulation of current-carrying components in electrical apparatus. For example, they may be used in the form of slot liners in electrical motors and insulation in transformers, capacitors, cables etc. Films of the polymers may also be used as decorative trim and as packaging for items to be exposed to radiation. The polymers may also be moulded, e.g. into hot-water or corrosion resistant pipe or into containers. Solutions of the polymers may be used as varnishes and adhesives and for coating wire, fabric, etc. Fibres formed from them, for example by spinning from solution, may be woven into fabric, e.g. for making protective clothing or filters, or may be formed into woven electrical sheathing.

The copolyamides may be mixed with additives such as heat and light stabilisers, lubricants, plasticisers, pigments, dyes, mould-release agents and fillers such as glass fibre, asbestos fibre, finely powdered metals or metal oxides, graphite, carbon black, ground glass and molybdenum disulphide, and may be blended with other polymeric materials, natural or synthetic.

The preparation and properties of these copolyisophthalamides are illustrated by the following examples in which all parts are expressed as parts by weight.

EXAMPLE 29

3.00 parts (75 mole percent) of 4,4'-diaminodiphenyl ether and 1.242 parts (25 mole percent) of 4,4'-diaminodiphenyl sulphone were weighed into a dry three-necked reaction vessel equipped with stirrer, nitrogen inlet, drying tube and thermometer. 28 parts of N,N-dimethylacetamide were added and the mixture stirred under nitrogen until the diamines dissolved. The solution was cooled to −15° C. and 4.066 parts of powdered isophthaloyl chloride added over a period of 2 minutes. The resultant exotherm carried the reaction temperature to +10° C. and the mixture became very viscous. The cooling bath was removed and the mixture allowed to warm to room temperature, stirring being continued for a further 60 minutes. The solution was diluted with 112 parts of dimethylformamide, filtered, and the product precipitated by dropwise addition to 500 parts of vigorously stirred distilled water. Further purification of the precipitated polymer was effected by repeated washing with fresh distilled water in a high speed mixer. Drying at 130° C. under an absolute pressure of 0.1 mm. of Hg for 2 hours gave 6.7 parts of product with a reduced viscosity of 1.73, measured on a solution of 1 g. polymer in 100 ml. of 98% aqueous sulphuric acid at 25° C.

X-ray examination of this powdered polymer showed it to be amorphous, and annealing from 250° C. at 5° per minute did not induce any detectable crystallinity in the powder. Differential Thermal Analysis showed no melting transition.

Transparent, 0.005″ thick films were prepared by compression moulding the dried powder for 3 minutes at 350° C. These films were also amorphous by X-ray examination.

Strips of film which were drawn to three times their original length over a hot pin at 260° C. did not crystallise and no crystallisation occurred when strips of the drawn film held under light tension were immersed for 4 hours in (a) formic acid at 95° C. and (b) 50:50 dimethyl acetamide: water mixtures at reflux.

The melt viscosity of the polymer, measured on a Weissenberg Rheogoniometer at 350° C., was $3 \times 10^7$ poises at a shear rate of $10^{-2}$ sec. $^{-1}$. By comparison a copolyisophthalamide containing 75 mole percent 4,4'-diaminodiphenyl sulphone and 25 mole percent 4,4'-diaminodiphenyl ether, prepared by a similar technique to that described above and having a similar reduced viscosity, had a melt viscosity more than a decade greater at $4 \times 10^8$ poise, measured under the same conditions.

A film was also prepared from the polymer by slow evaporation at 100° C. of a 5% solution in dimethylformamide. This film, after further drying at 110° C. and 0.1 mm. of Hg (absolute pressure) for 12 hours, was transparent and tough (having a degree of toughness of 7–9) and was amorphous on X-ray examination. (The degree of toughness is the number of times the film can be creased through 180° C. and then opened out and creased in the opposite manner through 180° C. without breaking across the crease line.)

EXAMPLE 30

2.50 parts (62.5 mole percent) of 4,4'-diaminodiphenyl ether and 1.865 parts (37.5 mole percent) of 4,4'-diaminodiphenyl sulphone were dissolved in 33 parts of N,N-dimethylacetamide and reacted under the conditions described in Example 29 with 4.060 parts of isophthaloyl chloride to give 6.9 parts of dry polymer having a reduced viscosity (measured as in Example 29) of 1.80. The polymer as prepared was amorphous on X-ray examination and no melting transition was detected by Differential Thermal Analysis. Solvent-cast and compression-moulded films, prepared as described in Example 29, were also amorphous on X-ray examination. Immersion of drawn films in either formic acid at 95° C. or a refluxing 50:50 water: dimethylacetamide mixture, as described in Example 29, did not induce any crystallinity.

The melt viscosity of this polymer, measured at 350° C. and a shear rate of $10^{-2}$ sec. $^{-1}$, was $2 \times 10^7$ poises.

EXAMPLE 31

3.40 parts (85 mole percent) of 4,4'-diaminodiphenyl ether and 0.745 part (15 mole percent) of 4,4'-diaminodiphenyl sulphone were reacted with 4.060 parts of isophthaloyl chloride as described in Example 29 to give 6.2 parts of dry polymer having a reduced viscosity of 2.01 (measured as described in Example 29).

Films prepared by solvent-casting or compression-moulding as described in Example 29 were transparent and amorphous on X-ray examination, both as formed and after drawing and treating with formic acid at 95° C. as described in Example 29.

By way of comparison, a polymer having a reduced viscosity of 2.67 and prepared from 90 mole percent of 4,4'-diaminodiphenyl ether and 10 mole percent of 4,4'-diaminodiphenyl sulphone gave translucent solvent-cast films which X-ray examination showed to be crystalline, the diffraction pattern being that of the homopolymer: poly(4,4'-oxydiphenylene isophthalamide).

The level of crystallinity was raised by treating the drawn film with formic acid at 95° C. for 4 hours. Crystalline birefringence could be detected in the cast film by examination under the polarising microscope.

What we claim is:

1. Amorphous or at most only weakly crystalline and thermally non-crystallizable aromatic polyamide of sufficient molecular weight to be film- or fiber-forming, characterized by the absence of the property of undergoing on heating a first order phase transformation of melting from the solid crystalline condition to the wholly liquid state and formed of macromolecular chains consisting essentially of repeating diamide units derived from (a) at least one diamine and (b) at least one diacid in which the carboxylic acid groups are on non-adjacent carbon atoms, from 50 to 100 mole percent of the diamine component being at least one diaminodiphenyl sulphone and from 0 to 50 mole percent being selected from the group consisting of phenylene diamine and diaminodiphenyl ether, and from 50 to 100 mole percent of the diacid component being selected from the group consisting of (i) isophthalic acid,
(ii) 2-, 4-, and 6-mono-chloroisophthalic acids,
(iii) dichloroisophthalic acids and dichloroterephthalic acids,
(iv) mono - $C_{1-6}$ - alkoxy - isophthalic and terephthalic acids, and
(v) dicarboxydiphenyl ethers, and from 0 to 50 mole percent thereof being terephthalic acid, not more than 90% of the diamide units in the macromolecular chains having the structure:

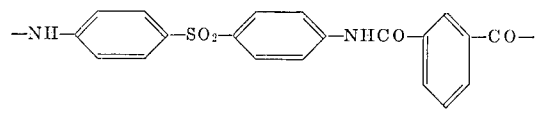

2. A polyamide according to claim 1 in which the diacid is 4-chloroisophthalic acid, 2,5-dichloroisophthalic acid or 2,5-dichloroterephthalic acid.

3. A polyamide according to claim 1 in which the diacid is a monoalkoxyterephthalic acid or a 2-, 4- or 5-alkoxyisophthalic acid.

4. A polyamide according to claim 1 in which the diaminodiphenyl sulphone is 3,3'-diaminodiphenyl sulphone or 4,4'-diaminodiphenyl sulphone.

5. A polyamide of sufficient molecular weight to be film- or fiber-forming, said polyamide being formed of macromolecular chains consisting essentially of repeating units having the structure

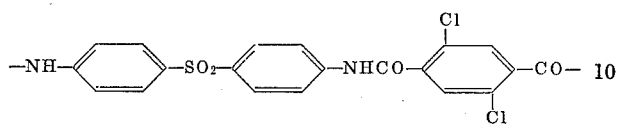

6. A polyamide of sufficient molecular weight to be film- or fiber-forming, said polyamide being formed of macromolecular chains consisting essentially of repeating units having the structure

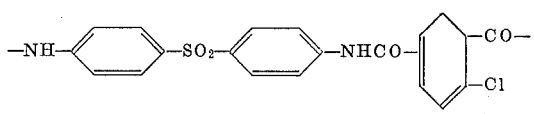

7. A polyamide of sufficient molecular weight to be film- or fiber-forming, said polyamide being formed of macromolecular chains consisting essentially of repeating units having the structure

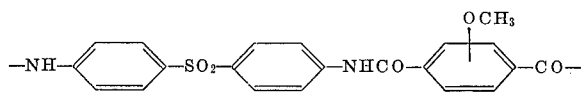

8. A polyamide of sufficient molecular weight to be film- or fiber-forming, said polyamide being formed of macromolecular chains consisting essentially of repeating units having the structure

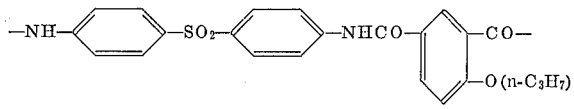

9. A polyamide of sufficient molecular weight to be film- or fiber-forming, said polyamide being formed of macromolecular chains consisting essentially of repeating units having the structure

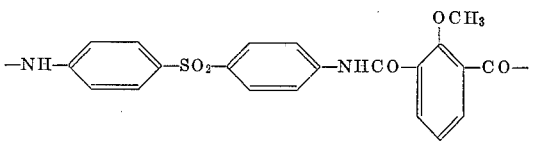

10. A polyamide of sufficient molecular weight to be film- or fiber-forming, said polyamide being formed of macromolecular chains consisting essentially of repeating units having the structure

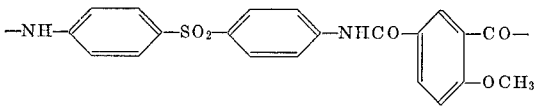

11. A polyamide of sufficient molecular weight to be film- or fiber-forming, said polyamide being formed of macromolecular chains consisting essentially of repeating units having the structure

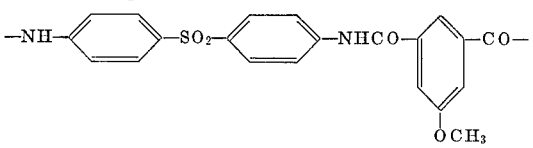

12. A polyamide of sufficient molecular weight to be film- or fiber-forming, said polyamide being formed of macromolecular chains consisting essentially of repeating units having the structure

13. A polyamide according to claim 1 derived from 4,4-' diaminodiphenyl sulphone and a mixture of isophthalic acid with at least one other acid specified in claim 1.

14. A copolyamide as claimed in claim 13 formed of macromolecular chains consisting essentially of repeating units having the structures

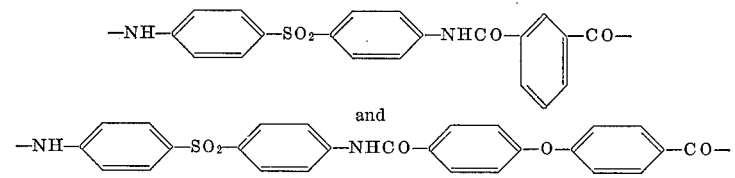

15. A polyamide as claimed in claim 1 which is a copolymer formed of macromolecular chains consisting essentially of repeating units having the structures

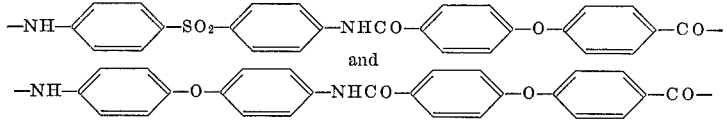

16. A polyamide as claimed in claim 1 which is a copolymer formed of macromolecular chains consisting essentially of repeating units having the structures

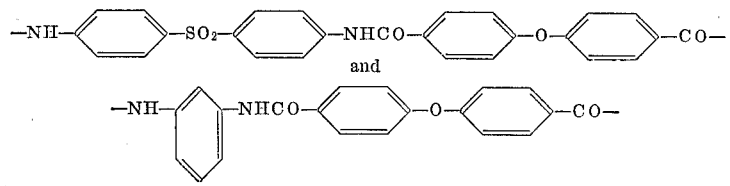

17. A polyamide as claimed in claim 1 which is a copolymer formed of macromolecular chains consisting essentially of repeating units having the structures

and

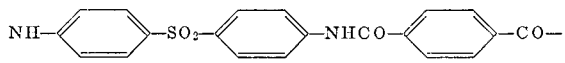

18. A polyamide as claimed in claim 1 which is a copolymer formed of macromolecular chains consisting essentially of repeating units having the structures

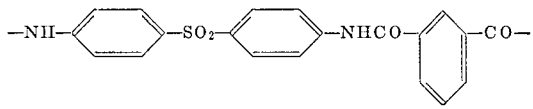

and

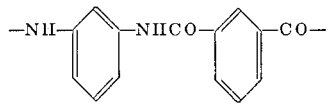

19. A polyamide as claimed in claim 1 which is a copolymer formed of macromolecular chains consisting essentially of repeating units from 90 to 50% of which have the structure

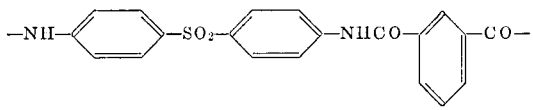

and from 10 to 50% of which have the structure

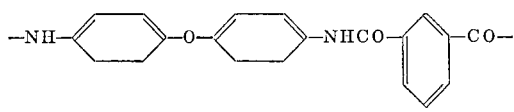

20. A polyamide according to claim 1 having a reduced viscosity, measured on a solution of 1 gm. of polymer in 100 ccs. of 98% sulphuric acid at 28° C. of from 0.3 to 2.0.

21. A shaped article, formed from a polyamide according to claim 1.

22. A coating solution of a polyamide according to claim 1 in a highly polar organic solvent therefor.

23. An amorphous, or at most only weakly crystalline, and thermally non-crystallizable aromatic polyamide of sufficient molecular weight to be film- or fiber-forming, characterized by the absence of the property of undergoing on heating a first order phase transformation of melting from the solid crystalline condition to the wholly liquid state and formed of macromolecular chains consisting essentially of repeating diamide units derived from (a) as the aromatic diamine component, a mixture of at least one diaminodiphenyl sulphone with at least one diaminodiphenyl ether wherein the diaminodiphenyl ether forms more than 50 mole percent but less than 88 mole percent of the diamine mixture, and (b) as the aromatic dicarboxylic acid component, isophthalic acid or a mixture thereof with at least one other aromatic dicarboxylic acid which is present in an amount, not exceeding 50 mole percent of the dicarboxylic acid mixture, which will not induce crystallinity or introduce crystallizability into the polymer.

24. A polyamide as claimed in claim 23 in which the aromatic dicarboxylic acid component comprises a mixture of isophthalic acid with at least one acid selected from terephthalic acid and dicarboxydiphenyl ethers.

25. A polyamide as claimed in claim 23 in which an amount up to 50 mole percent of either or both of the diaminodiphenyl sulphone and the diaminodiphenyl ether is replaced by at least one other aromatic diamine, said amount being less than that which would induce crystallinity or introduce crystallisability into the polymer.

26. A polyamide as claimed in claim 25 in which said other aromatic diamine is selected from the group consisting of metaphenylene diamine and paraphenylene diamine.

27. Amorphous or at most only weakly crystalline and thermally non-crystallizable aromatic polyamide of sufficient molecular weight to be film- or fiber-forming, characterized by the absence of the property of undergoing on heating a first order phase transformation of melting from the solid crystalline condition to the wholly liquid state and formed of macromolecular chains consisting essentially of repeating diamide units more than 50 but less than 88 mole percent of which have the structure

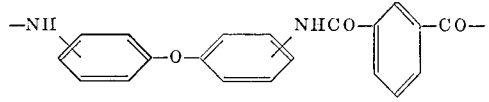

and the remainder of which have the structure

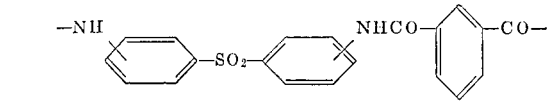

28. Amorphous or at most only weakly crystalline and thermally non-crystallizable aromatic polyamide of sufficient molecular weight to be film- or fiber-forming, characterized by the absence of the property of undergoing on heating a first order phase transformation of melting from the solid crystalline condition to the wholly liquid state and formed of macromolecular chains consisting essentially of repeating diamide units more than 50 but less than 88 mole percent of which have the structure

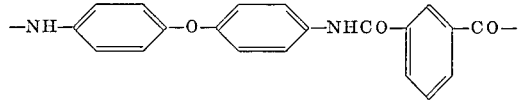

and the remainder of which have the structure

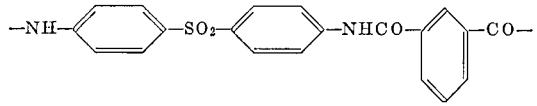

29. Polyamide as claimed in claim 23 in which the diaminodiphenyl ether forms at most 80 mole percent of the diamine mixture.

30. A molded shaped article, formed from a polyamide as claimed in claim 23.

31. A solution of a polyamide as claimed in claim 23 in a highly polar organic solvent therefor.

References Cited

UNITED STATES PATENTS 3,063,966 11/1962 Kwolek et al. _____ 260—78
3,094,511 6/1963 Hill et al. _____ 260—78

WILLIAM H. SHORT, Primary Examiner

L. L. LEE, Assistant Examiner

U.S. Cl. X.R.

117—101; 260—65, 78, 30.6, 30.8, 312, 324, 326, 328